(12) United States Patent
Pu et al.

(10) Patent No.: US 7,938,979 B2
(45) Date of Patent: May 10, 2011

(54) METHOD OF FABRICATING MIRRORS FOR LIQUID CRYSTAL ON SILICON DISPLAY DEVICE

(75) Inventors: Xianyong Pu, Shanghai (CN); Jianhong Mao, Shanghai (CN); Yiqun Chen, Shanghai (CN); Jing Fu, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 658 days.

(21) Appl. No.: 11/862,971

(22) Filed: Sep. 27, 2007

(65) Prior Publication Data

US 2008/0135515 A1 Jun. 12, 2008

(30) Foreign Application Priority Data

Dec. 8, 2006 (CN) .......................... 2006 1 0119367

(51) Int. Cl.
*C03C 15/00* (2006.01)
*C03C 25/68* (2006.01)

(52) U.S. Cl. .............. 216/88; 216/83; 216/67; 438/690; 438/689; 438/692; 438/745

(58) Field of Classification Search ........................ None
See application file for complete search history.

(56) References Cited

U.S. PATENT DOCUMENTS

| 6,040,243 | A | * | 3/2000 | Li et al. .......................... 438/687 |
| 6,437,839 | B1 | | 8/2002 | Cacharelis |
| 2004/0259315 | A1 | * | 12/2004 | Sakaguchi et al. ............ 438/285 |
| 2005/0151264 | A1 | * | 7/2005 | Saito et al. ..................... 257/762 |
| 2005/0250231 | A1 | * | 11/2005 | Jen ................................... 438/30 |
| 2007/0026634 | A1 | * | 2/2007 | Yu .................................. 438/427 |

* cited by examiner

*Primary Examiner* — Nadine G Norton
*Assistant Examiner* — Stephanie Duclair
(74) *Attorney, Agent, or Firm* — Squire, Sanders & Dempsey (US) LLP

(57) ABSTRACT

The present invention discloses a method of fabricating mirrors for LCOS (Liquid Crystal On Silicon) display device, including: forming a dielectric layer over a silicon substrate; forming a stop layer over the dielectric layer; forming an insulation layer over the stop layer; etching the insulation layer and the stop layer until the dielectric layer is exposed, thus forming an insulation fence; forming a metal layer over the dielectric layer and the insulation fence; and planarizing the metal layer and the insulation fence, hence the planarized insulation fence isolating the metal layer into mirror array. Therefore no pits can be generated in the metal layer and no pits can be generated in the mirrors formed subsequently, resulting in high quality mirror surface.

19 Claims, 9 Drawing Sheets

METHOD OF FABRICATING MIRRORS FOR LIQUID CRYSTAL ON SILICON DISPLAY DEVICE

This application claims the priority of Chinese Patent Application No. 200610119367.0, filed Dec. 8, 2006, the entire disclosure of which is incorporated herein by reference.

FIELD OF THE INVENTION

The present invention relates to a method for fabricating LCOS (Liquid Crystal On Silicon) display device, and in particular to a method of fabricating mirrors for LCOS display device.

BACKGROUND OF THE INVENTION

LCOS display device is a latest liquid crystal display device. Unlike a conventional liquid crystal display device, LCOS process is compatible with CMOS process, thus driving circuit can be implemented on silicon wafer. The LCOS display device may have a small size and high resolution since the CMOS process can be utilized to fabricate active pixel matrix on silicon substrate.

Typically, an ideal LCOS is flat, smooth and of high reflectivity, so as to ensure an appropriate arrangement of liquid crystals, a uniform thickness of the liquid crystal layer, and no distortion of light. Thus, high quality mirrors are required to control the reflected light accurately. It is a key factor for advanced applications, such as projection television, etc.

An existing method of fabricating mirrors for LCOS display device is disclosed in, e.g., U.S. Pat. No. 6,437,839, which includes the following steps. As shown in FIG. 1A, a dielectric layer 101 is formed over a silicon substrate, a metal layer 102 of an Al—Cu alloy (a content of Cu is 0.5%) is formed over the dielectric layer 101 by sputtering method; an anti-reflective layer 103 is coated over the metal layer 102 to protect the metal layer 102 during exposure; and a photoresist layer 104 is formed over the anti-reflective layer 103 and is subjected to exposure and development, thereby forming an opening pattern 107.

Referring to FIG. 1B, the anti-reflective layer 103 and the metal layer 102 are etched using the photoresist layer 104 as mask until the dielectric layer 101 is exposed, so as to form a trench 105.

Referring to FIG. 1C, an ashing process is performed to the photoresist layer 104 and the anti-reflective layer 103; the residual photoresist layer 104 and the anti-reflective layer 103 are further removed by using basic solution; and an insulation layer 106 is formed over the metal layer 102 by HDPCVD (High-Density Plasma Chemistry Vapor Deposition) method, so that the trench 105 is filled with the insulation layer 106.

Referring to FIG. 1D, the insulation layer 106 is planarized through CMP (Chemical Mechanical Polishing) method, and then is dry-etched until the metal layer 102 is exposed, thus forming mirror array 108.

FIG. 2 is a schematic diagram of mirrors with pits for LCOS display device fabricated by the existing method. During removing the residual photoresist layer 104 and the anti-reflective layer 103 with basic solution, the Al—Cu alloy in the metal layer has an electrochemical reaction with the basic solution, and thus Al is consumed, so that the metal layer has many pits, and further the mirror formed subsequently has many pits. When mirrors are observed in an optical microscope with an amplification rate of 500, many white bright spots can be found, i.e. the pits with a size ranging from 1 μmm to 3 μm.

In the prior art, during fabrication of mirrors for LCOS display device, particularly when removing the residual photoresist layer and anti-reflective layer with basic solution, the Al—Cu alloy in the metal layer has an electrochemical reaction with the basic solution, and thus Al is consumed, so that the metal layer has many pits, and further mirrors formed subsequently have many pits. Consequently, mirrors may be degraded.

SUMMARY OF THE INVENTION

An object of the invention is to provide a method of fabricating mirrors for LCOS display device, which can prevent pits occurring in the mirrors of the LCOS display device.

To this end, an embodiment of the invention provides a method of fabricating mirrors for LCOS display device, comprising: forming a dielectric layer over a silicon substrate; forming a stop layer over the dielectric layer; forming an insulation layer over the stop layer; etching the insulation layer and the stop layer until the dielectric layer is exposed, thus forming an insulation fence; forming a metal layer over the dielectric layer and the insulation fence; and planarizing the metal layer and the insulation fence, thus the planarized insulation fence isolating the metal layer into mirror array.

Preferably, the stop layer may be formed through CVD (Chemical Vapor Deposition) method. The stop layer may be made of silicon nitride, and may have a thickness ranging from 50 Å to 1000 Å.

Preferably, the insulation layer may be formed through CVD method. The insulation layer may be made of TEOS (tetraethyl orthosilicate), and may have a thickness ranging from 2000 Å to 10000 Å before planarization.

Preferably, the insulation layer and the stop layer may be etched through dry etching method.

Preferably, the metal layer may be formed through PVD (Physical Vapor Deposition) method. The metal layer may be made of an Al—Cu alloy, and may have a thickness ranging from 1000 Å to 8000 Å before planarization, and the planarized metal layer may have a thickness ranging from 500 Å to 7500 Å.

Preferably, the metal layer and the insulation fence may be planarized through CMP (Chemical Mechanical Polishing) method.

The embodiments of the invention are advantageous over the prior art in that: the step for forming the metal layer and the step for forming the insulation fence are reversed, that is, forming the insulation fence firstly and then forming the metal layer; and the metal layer and the insulation fence are planarized directly through CMP method. Thus, there is no chance of a contact and hence an electrochemical reaction of the Al—Cu alloy in the metal layer with basic solution, and therefore no pits can be generated in the metal layer and no pits can be generated in the mirrors formed subsequently, resulting in high quality mirror surface.

DETAILED DESCRIPTION OF THE EMBODIMENTS

LCOS display device is a latest liquid crystal display device. Unlike a conventional liquid crystal display device, LCOS process is compatible with CMOS process, thus driving circuit can be implemented on silicon wafer. The LCOS display device may have a small size and high resolution since the CMOS process can be utilized to fabricate active pixel matrix on silicon substrate. In an embodiment of the invention, the step for forming the metal layer and the step for forming the insulation fence are reversed, that is, forming the insulation fence firstly and then forming the metal layer; and the metal layer and the insulation fence are planarized directly through CMP method. Thus, there is no chance of a contact and hence an electrochemical reaction of the Al—Cu alloy in the metal layer with basic solution, and therefore no pits can be generated in the metal layer and no pits can be generated in the mirrors formed subsequently, resulting in high quality mirror surface.

To make the above objects, features and advantages of the invention more apparent and better understood, embodiments of the invention will be described in detail with reference to the drawings.

Figure 1A:
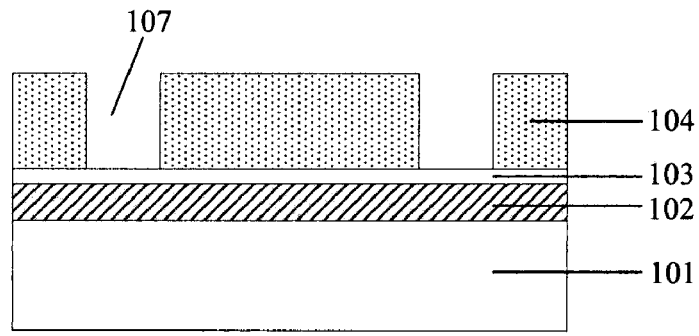
FIG. 1A through FIG. 1D are schematic diagrams of fabricating mirrors for LCOS display device in the prior art.
Figure 1B:
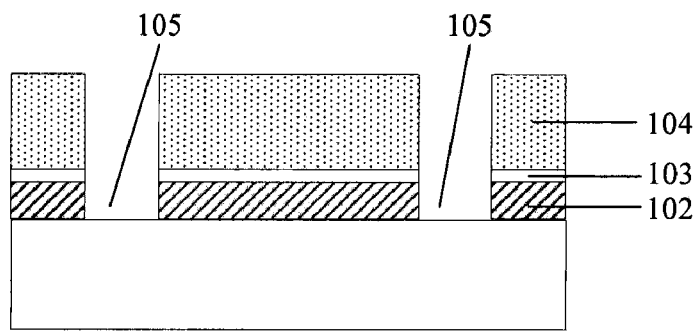
Figure 1C:
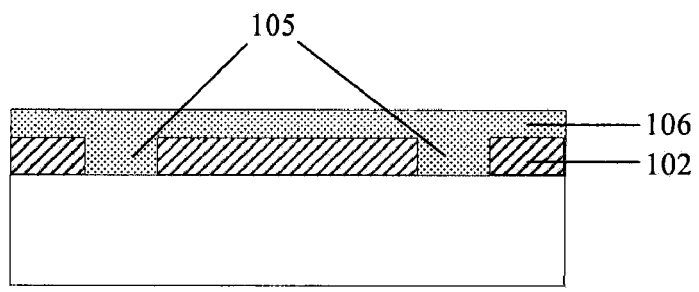
Figure 1D:
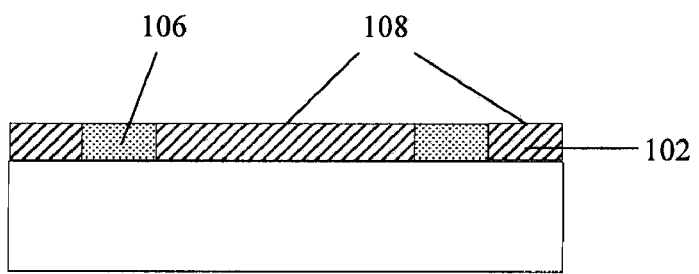
Figure 2:
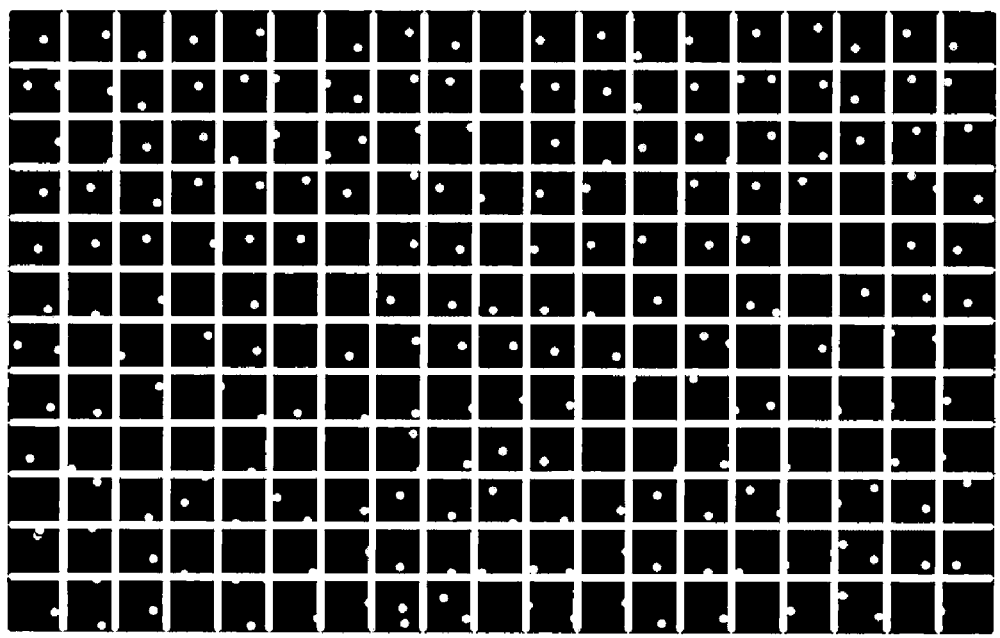
FIG. 2 is a schematic diagram of mirrors with pits for LCOS display device fabricated by the existing method.
Figure 3:
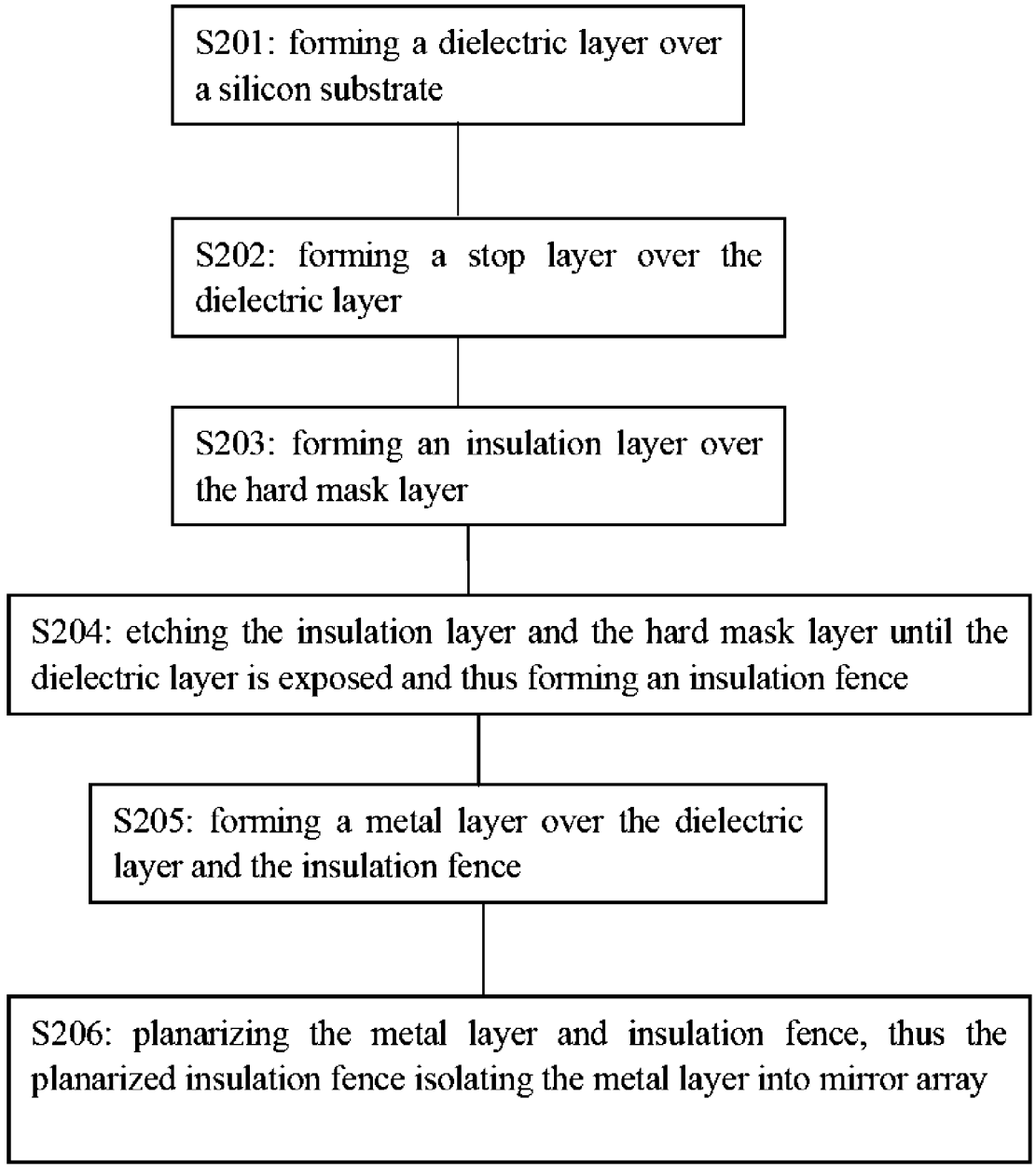
FIG. 3 is a flow chart of fabricating mirrors for LCOS display device according to an embodiment of the invention.

FIG. 3 is a flow chart of fabricating mirrors for LCOS display device according to an embodiment of the invention. As illustrated in FIG. 3, a dielectric layer is formed over a silicon substrate in step S201; a hard mark layer is formed over the dielectric layer in step S202; an insulation layer is formed on the hard marks layer in S203; in step S204, the insulation layer and the stop layers are etched until the dielectric layer is exposed, thus forming an insulation fence; a metal layer is formed over the dielectric layer and the insulation fence in step S 205; and in step S206, the metal layer and the insulation fence are planarized, so that the planarized insulation fence isolates the metal layer into mirror array.

FIG. 4A through FIG. 4D are schematic diagrams of fabricating mirrors for LCOS display device according to an embodiment of the invention. As illustrated in FIG. 4, a dielectric layer 201 is formed over a silicon substrate firstly; a stop layer 202 with a thickness ranging from 50 Å to 1000 Å is formed over the dielectric layer 201 using CVD method so as to control the depth and uniformity of the subsequent etching process over the wafer; and an insulation layer 203 for isolation between devices is formed over the stop layer 203 using CVD method.

In this embodiment, the stop layer 202 has a thickness of, for example, 50 Å, 100 Å, 200 Å, 300 Å, 400 Å, 500 Å, 600 Å, 700 Å, 800 Å, 900 Å or 1000 Å, preferably 320 Å, and the stop layer 202 is made of silicon nitride.

In this embodiment, the insulation layer 203 has a thickness ranging from 2000 Å to 10000 Å, particularly, for example, 2000 Å, 3000 Å, 4000 Å, 5000 Å, 6000 Å, 7000 Å, 8000 Å, 9000 Å or 10000 Å, preferably ranging from 5000 Å to 6000 Å, and the insulation layer 203 is made of tetraethyl orthosilicate (TEOS), plasma enhanced silicon dioxide (PEOX) or silicon rich oxide (SRO), preferably TEOS.

Figure 4A:
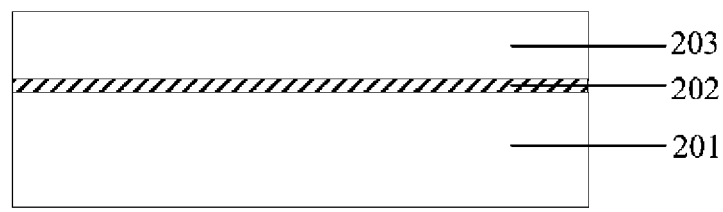
FIG. 4A through FIG. 4D are schematic diagrams of fabricating mirrors for LCOS display device according to an embodiment of the invention.
Figure 4B:
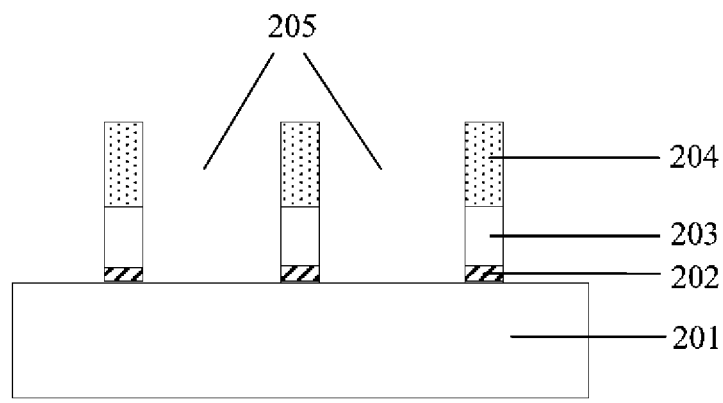

Referring to FIG. 4B, a photoresist layer 204 with a thickness ranging from 3000 Å to 20000 Å is formed over the insulation layer 203 through spin coating method, and then the photoresist layer 204 is subjected to exposure and development to form an opening patterns 205; and using the photoresist layer 204 as mask, the insulation layer 203 is dry etched until the stop layer 202 is exposed, and then the stop layer 202 is dry etched until the dielectric layer 201 is exposed.

In this embodiment, a thickness of the photoresist layer 204 is, for example, 3000 Å, 4000 Å, 5000 Å, 6000 Å, 7000 Å, 8000 Å, 9000 Å, 10000 Å, 11000 Å, 12000 Å, 13000 Å, 14000 Å, 15000 Å, 16000 Å, 17000 Å, 18000 Å, 19000 Å or 20000 Å, preferably 10500 Å.

Figure 4C:
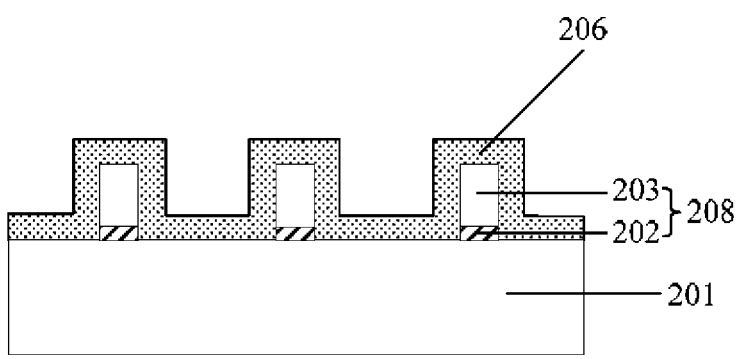

Referring to FIG. 4C, the photoresist layer 204 is removed through ashing method, and the etched insulation layer 203 and the stop layer 202 constitute an insulation fence 208; and a metal layer 206 is formed over the dielectric layer 201 and the insulation fence 208 through PVD (Physical Vapor Deposition) method in order to form mirrors for LCOS later.

In this embodiment, the photoresist layer 204 is removed through an ashing method at a temperature ranging from 100° C. to 300° C., particularly, for example, 100° C., 150° C., 200° C., 250° C. or 300° C.

In this embodiment, the metal layer 206 has a thickness ranging from 1000 Å to 8000 Å, particularly, for example, 1000 Å, 2000 Å, 3000 Å, 4000 Å, 5000 Å, 6000 Å, 7000 Å or 8000 Å, preferably 3000 Å, the metal layer 206 is made of a Cu—Al alloy (e.g. Cu content is 0.5%) and has a reflectivity of up to 90%.

Figure 4D:
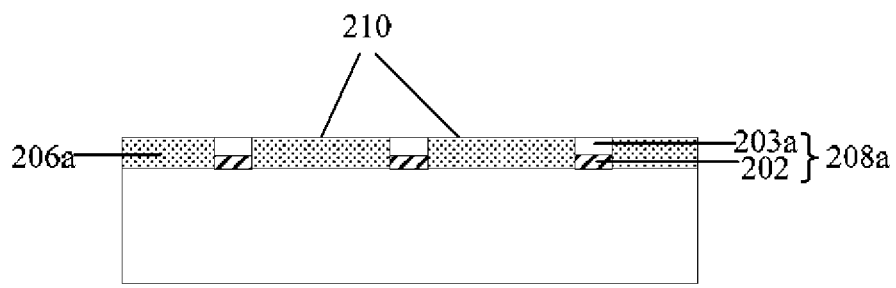

Referring to FIG. 4D, the metal layer and the insulation fence are planarized through CMP method. A planarized metal layer 206a and a planarized insulation layer 203a are coplanar, and the planarized insulation layer 203a and the stop layer 202 constitute a planarized insulation fence 208a which isolates the metal layer into mirror array 210.

In this embodiment, the planarized metal layer 206a has a thickness ranging from 500 Å to 7500 Å, particularly, for example, 500 Å, 1000 Å, 1500 Å, 2000 Å, 2500 Å, 3000 Å, 3500 Å, 4000 Å, 4500 Å, 5000 Å, 5500 Å, 6000 Å, 6500 Å, 7000 Å or 7500 Å.

Figure 5A:
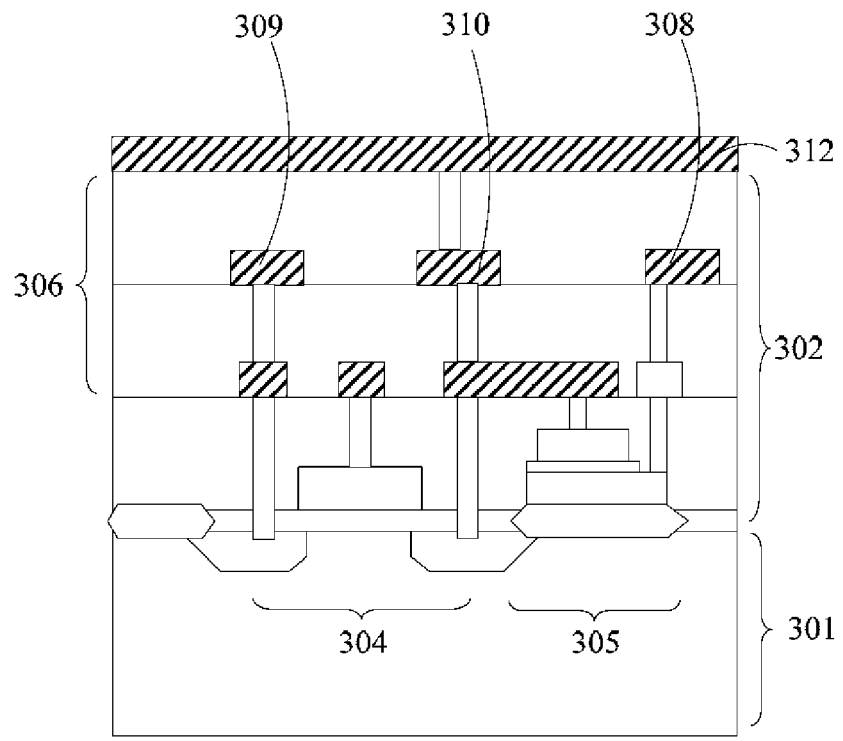
FIG. 5A through FIG. 5H are schematic diagrams of fabricating mirrors for LCOS display device according to an embodiment of the invention.

FIG. 5A through FIG. 5H are schematic diagrams of fabricating mirrors for LCOS display device according to an embodiment of the invention. Referring to FIG. 5A, a pixel switch circuit layer 302 is formed over a silicon substrate 301. The silicon substrate 301 includes an internal driving circuit, i.e. a dynamic random memory composed of an MOS transistor 304 and a capacitor 305 in series. The pixel switch circuit layer 302 includes an interlayer insulation layer 306, a ground pad 308 embedded in the interlayer insulation layer 306, a signal pad 309, a connecting pad 310 and vias connecting upper and lower conductive layers. Herein, the ground pad 308 is used to supply ground signal; the signal pad 309 is used to apply voltage to the MOS transistor 304 of the driving circuit, and is electrically connected to a drain terminal of the MOS transistor 304 of the driving circuit underneath through vias; a source terminal of the MOS transistor 304 and a terminal of the capacitor 305 are electrically connected to the connecting pad 310 through vias (i.e. an upper electrode), and the other terminal of the capacitor is electrically connected to the ground pad 308 through vias (i.e. a lower electrode).

Then a conductive layer 312 is formed over the interlayer insulation layer 306, which is made of one or more conductive material layers, preferably a multi-layer structure made of titanium, titanium nitride, an Al—Cu alloy, titanium nitride and titanium in sequence and preferably a thickness ranging from 1000 Å to 6000 Å.

Figure 5B:
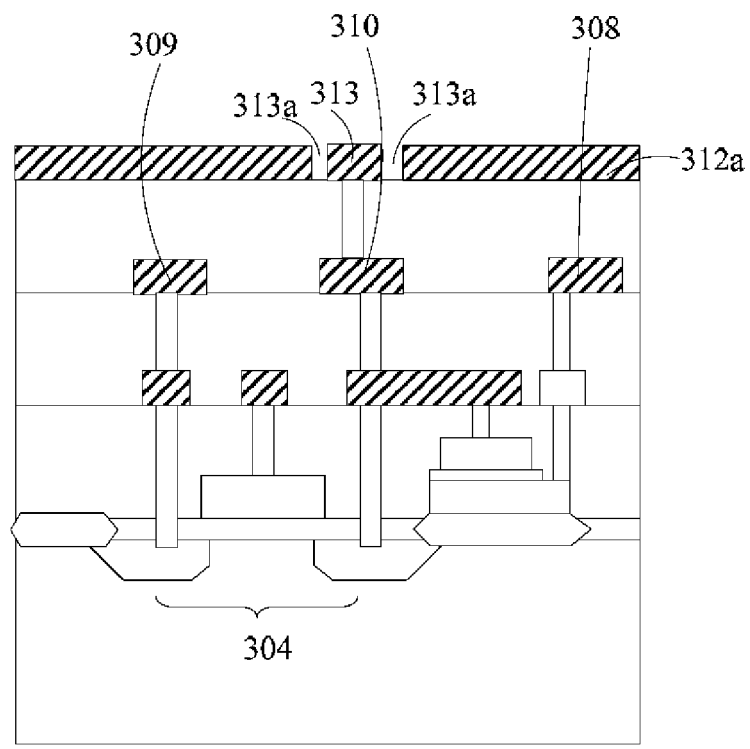

Referring to FIG. 5B, a first patterned photoresist layer (not shown) is formed over the conductive layer 312 through photolithographic process; and an island-like pad 313 for connecting mirrors and light shielding layers 312a are formed in the conductive layer 312 through etching process using the photoresist layer as mask, where the light shielding layers 312a is formed to prevent light enter the circuit region in the silicon substrate and thus degrade the circuit performance and lifetime. Gaps 313a between the pad 313 for connecting mirrors and the light shielding layer 312a isolate the pad 313 for connecting mirrors from the light shielding 312a, and the pad 313 for connecting mirrors is electrically connected to the source terminal of the MOS transistor 304 of the pixel switch circuit layer through the connecting pad 310 and vias.

Figure 5C:
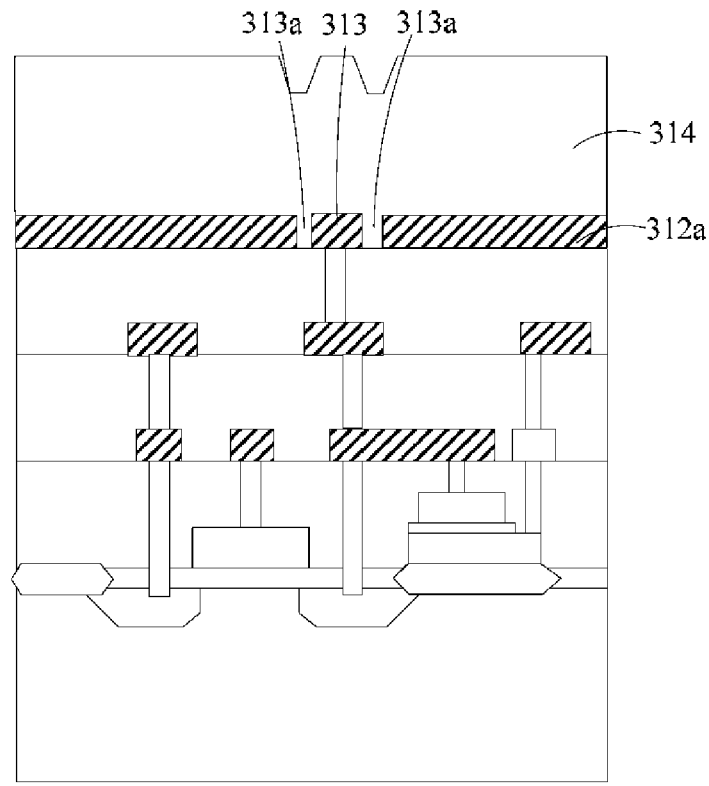

Referring to FIG. 5C, the first photoresist layer is removed; a dielectric layer 314 is formed over the light shielding layer 312a, the pad 313 for connecting mirrors and the gaps 313a through HDPCVD method. Due to the gaps 313a, grooves are generated in the dielectric layer 314 at a position corresponding to the gaps 313a. The thickness of the dielectric layer 314 ranges from 200 nm to 2000 nm, preferably from 200 nm to 1000 nm, and the dielectric layer 314 is made of silicon oxide, silicon nitride, silicon oxynitride or a combination thereof, or is made of a low-k dielectric material.

Figure 5D:
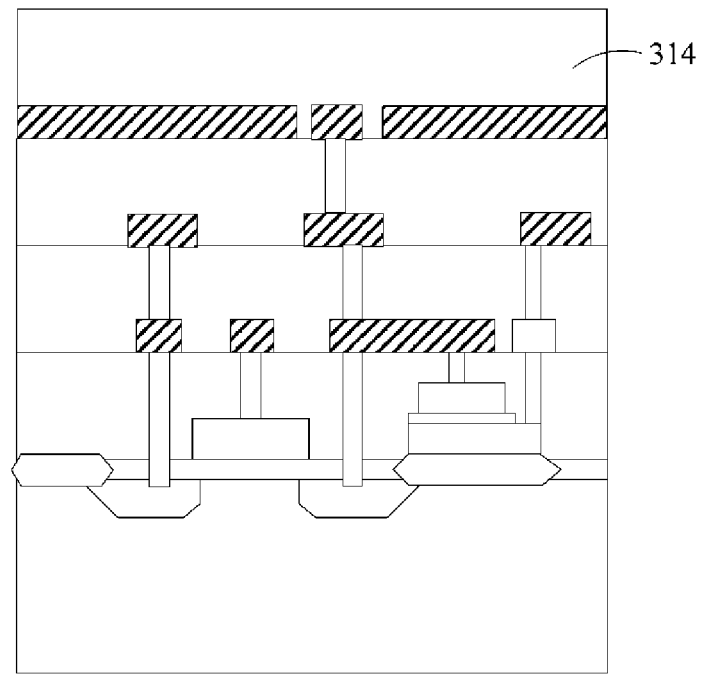

Referring to FIG. 5D, the dielectric layer 314 is polished until grooves at the surface of the dielectric layer 314 are removed through CMP method so as to planarize the dielectric layer 314, thus a layer deposited subsequently may have a flat surface.

Figure 5E:
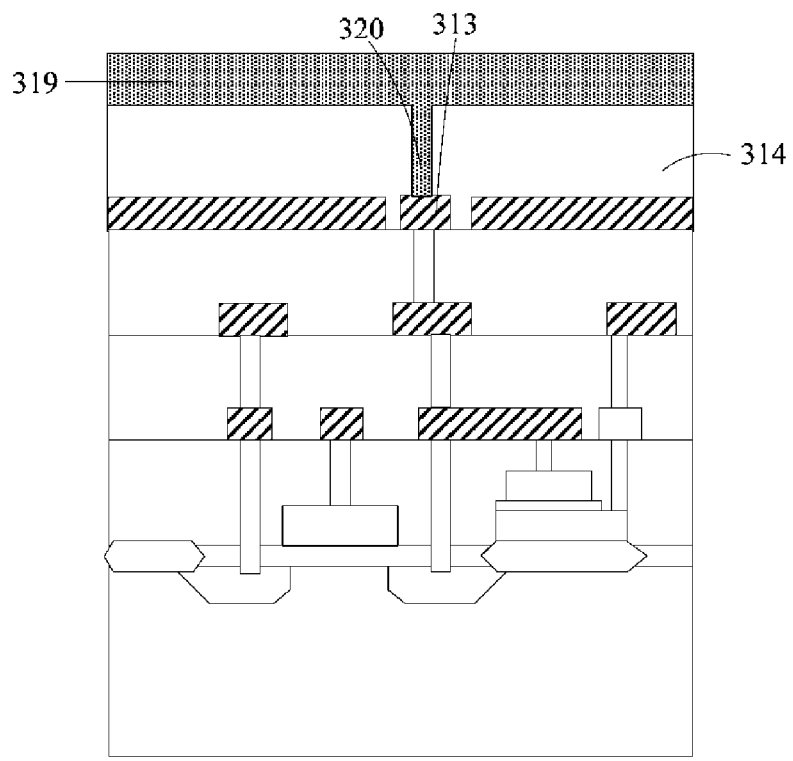

Referring to FIG. 5E, a second patterned photoresist layer (not shown) is formed over the dielectric layer 314 through photolithographic process; the dielectric layer 314 is etched using the second photoresist layer as mask until the pad 313 for connecting mirrors is exposed, thus forming an opening 320 which exposes a part of the pad 313 for connecting mirrors; a tungsten layer 319 is formed over the dielectric layer 314 through CVD method so as to fill the opening 320 with tungsten, thus forming a tungsten plug in connection with the pad 313 for connecting mirrors.

Figure 5F:
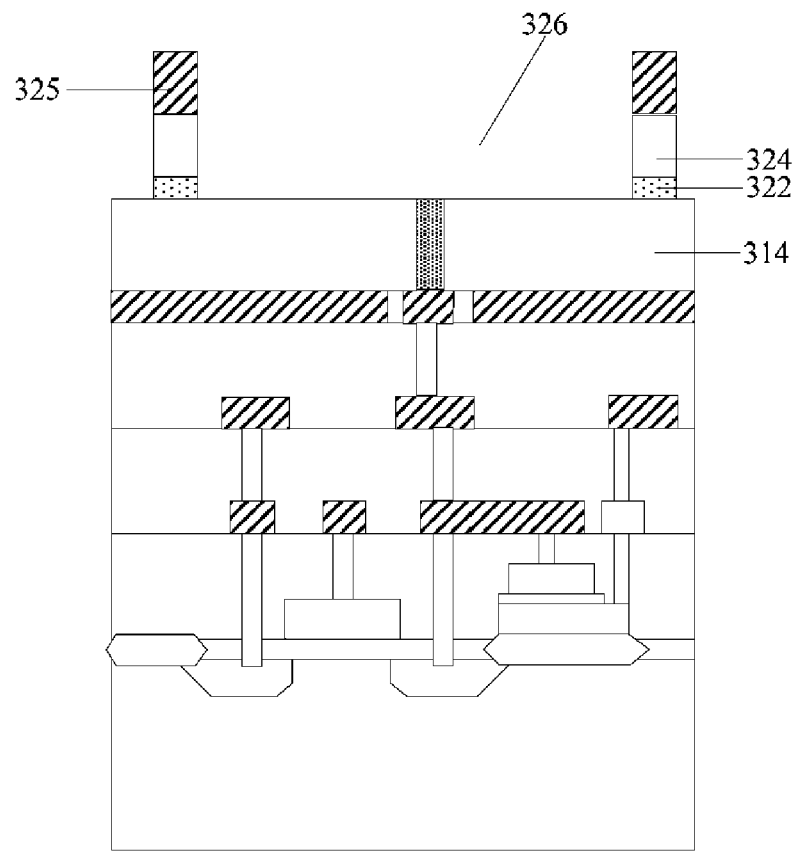

Referring to FIG. 5F, the tungsten layer 319 is polished until the dielectric layer 314 is exposed through CMP method; a stop layer 322 with a thickness ranging from 50 Å to 1000 Å is formed over the dielectric layer 314 through CVD method, thus covering the tungsten plug, where the stop layer 322 is formed to control the depth and the uniformity of the subsequent etching process over the wafer; an insulation layer 324 for an isolation between devices is formed over the stop layer 322 through CVD method; a third photoresist layer 325 with a thickness ranging from 2000 Å to 50000 Å, preferably from 3000 Å to 20000 Å, is formed over the insulation layer 324 through spin coating method, and then is subject to exposure and development, thus forming an opening pattern 326; the insulation layer 324 is etched until the stop layer 322 is exposed through dry etching process using the third photoresist layer 325 as mask; and the stop layer 322 is dry etched until the dielectric layer 314 and hence the tungsten plug are exposed.

In this embodiment, the stop layer 322 has a thickness of, for example, 50 Å, 100 Å, 200 Å, 300 Å, 400 Å, 500 Å, 600 Å, 700 Å, 800 Å, 900 Å or 1000 Å, preferably 320 Å, and the stop layer 322 is made of silicon nitride or the like.

In this embodiment, the insulation layer 324 has a thickness ranging from 2000 Å to 10000 Å, particularly, for example, 2000 Å, 3000 Å, 4000 Å, 5000 Å, 6000 Å, 7000 Å, 8000 Å, 9000 Å or 10000 Å, preferably from 5000 Å to 6000 Å. The insulation layer 324 is made of TEOS, PEOX or SRO, preferably TEOS.

In this embodiment, the third photoresist layer 325 has a thickness of, for example, 3000 Å, 4000 Å, 5000 Å, 6000 Å, 7000 Å, 8000 Å, 9000 Å, 10000 Å, 11000 Å, 12000 Å, 13000 Å, 14000 Å, 15000 Å, 16000 Å, 17000 Å, 18000 Å, 19000 Å or 20000 Å, preferably 10500 Å.

Figure 5G:
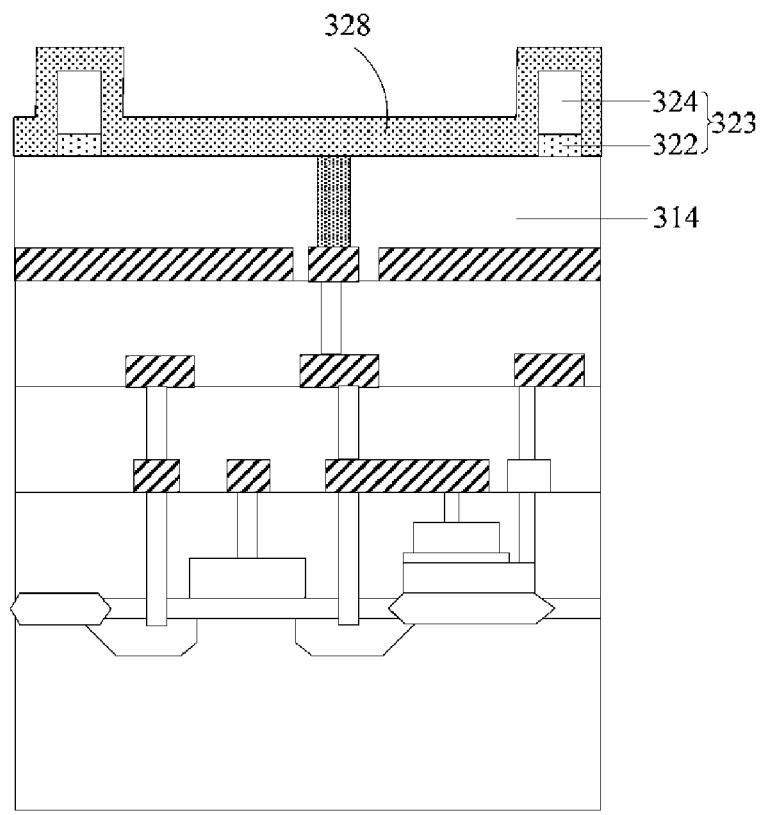

Referring to FIG. 5G, the third photoresist layer 325 is removed through ashing process, and the etched insulation layer 324 and the stop layer 322 constitute an insulation fence 323; a metal layer 328 is formed over the dielectric layer 314 and the insulation fence 323 through PVD method so as to form LCOS mirrors, where the metal layer 328 covers the tungsten plug.

In this embodiment, the third photoresist layer 325 is removed through ashing process at a temperature ranging from 100° C. to 300° C., particularly, for example, 100° C., 150° C., 200° C., 250° C. or 300° C.

In this embodiment, the metal layer 328 has a thickness ranging from 1000 Å to 8000 Å, particularly, for example, 1000 Å, 2000 Å, 3000 Å, 4000 Å, 5000 Å, 6000 Å, 7000 Å or 8000 Å, preferably 3000 Å. The metal layer 206 is made of Cu—Al alloy (e.g., Cu content is 0.5%) and the metal layer 328 has a reflectivity of up to 90%.

Figure 5H:
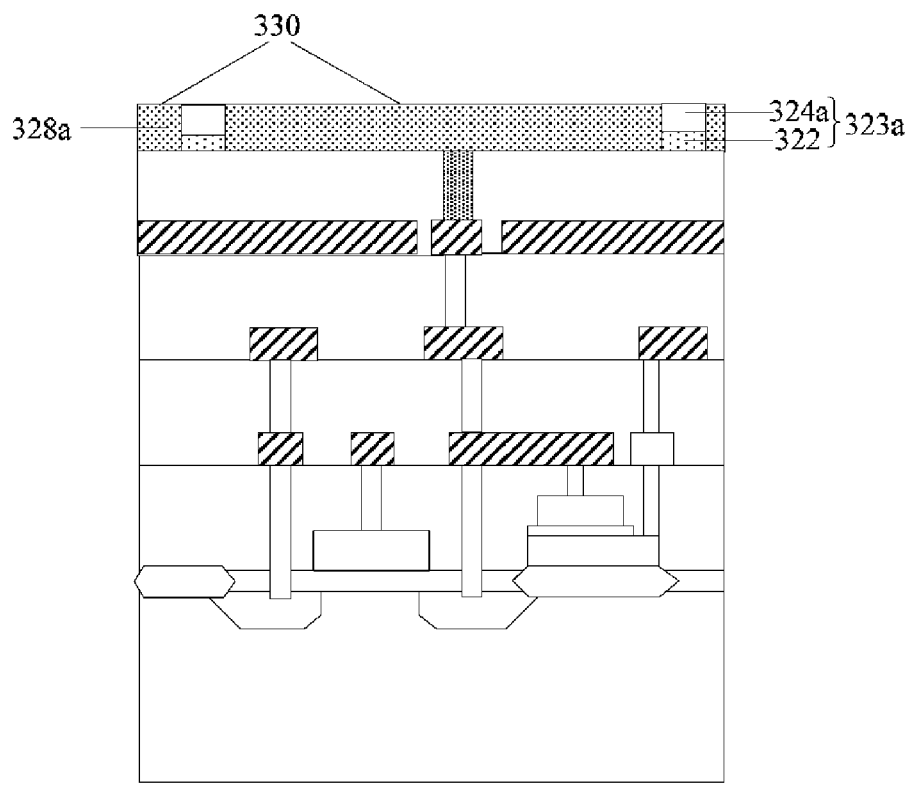

Referring to FIG. 5H, the metal layer and the insulation fence are planarized through CMP method. The planarized metal layer 328a and the planarized insulation layer 324a are coplanar, and the planarized insulation layer 324a and the stop layer 322 constitute a planarized insulation fence 323a which isolates the metal layer into mirror array 330.

In this embodiment, the planarized metal layer 328a has a thickness ranging from 500 Å to 7500 Å, particularly, for example, 500 Å, 1000 Å, 1500 Å, 2000 Å, 2500 Å, 3000 Å, 3500 Å, 4000 Å, 4500 Å, 5000 Å, 5500 Å, 6000 Å, 6500 Å, 7000 Å or 7500 Å.

Figure 6:
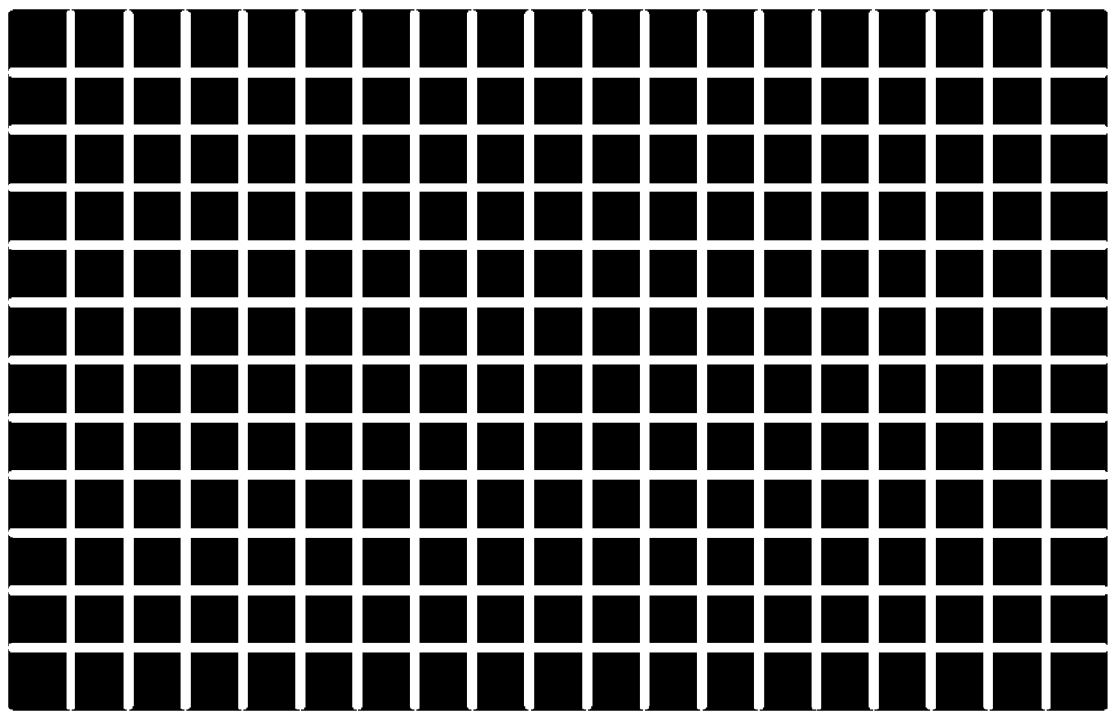
FIG. 6 is a schematic diagram showing mirrors for LCOS display device fabricated according to the embodiments of the invention.

FIG. 6 is a schematic diagram showing mirrors for LCOS display device fabricated according to the embodiments of the invention. As shown in FIG. 6, the step for forming the metal layer and the step for forming the insulation fence are reversed, that is, forming the insulation fence firstly and then forming the metal layer; and the metal layer and the insulation fence are planarized directly through CMP method. Thus, there is no chance of a contact and hence an electrochemical reaction of the Al—Cu alloy in the metal layer with basic solution, and therefore no pits can be generated in the metal layer and no pits can be generated in the mirrors formed subsequently. When the mirrors are observed using an optical microscope with an amplification rate of 500, no white bright spot can be found, that is, no pits has been generated on the mirror, and thus resulting in high quality mirror surface.

The present invention has been described and illustrated with reference to the embodiments thereof and the drawings. It shall be apparent to those skilled in the art that those embodiments and drawings are merely illustrative and not restrictive, that the present invention shall not be limited the embodiments disclosed here, and that various modifications and variations can be made thereto in light of the descriptions and the drawings without departing from the spirit and scope of the present invention as defined in the accompanying claims.

What is claimed is:

1. A method of fabricating mirrors for LCOS (Liquid Crystal On Silicon) display device, comprising:
    forming a dielectric layer over a silicon substrate;
    forming a stop layer over the dielectric layer;
    forming an insulation layer over the stop layer;
    etching the insulation layer and the stop layer until the dielectric layer is exposed, thus forming an insulation fence;
    forming a metal layer over the dielectric layer and the insulation fence; and immediately after forming the metal layer over the dielectric layer and the insulation fence, planarizing the metal layer and the insulation fence, thus the planarized insulation fence isolating the metal layer into mirror array;

wherein the metal layer is formed after forming the insulation fence, whereby there is no chance of a contact and hence an electrochemical reaction of the metal layer with basic solution, and no pits are generated in the metal layer and no pits are generated in the mirror array formed subsequently.

2. The method according to claim 1, wherein the stop layer is formed using a CVD (Chemical Vapor Deposition) method.

3. The method according to claim 2, wherein the stop layer is made of silicon nitride.

4. The method according to claim 3, wherein the stop layer has a thickness ranging from 50 Å to 1000 Å.

5. The method according to claim 4, wherein the insulation layer and the stop layer are etched using a dry etching method.

6. The method according to claim 3, wherein the insulation layer and the stop layer are etched using a dry etching method.

7. The method according to claim 2, wherein the insulation layer and the stop layer are etched using a dry etching method.

8. The method according to claim 1, wherein the insulation layer is formed using a CVD method.

9. The method according to claim 8, wherein the insulation layer is made of TEOS (tetraethyl orthosilicate).

10. The method according to claim 9, wherein the insulation layer and the stop layer are etched using a dry etching method.

11. The method according to claim 8, wherein the insulation layer and the stop layer are etched using a dry etching method.

12. The method according to claim 1, wherein the insulation layer has a thickness ranging 2000 Å to 10000 Å before the planarization.

13. The method according to claim 12, wherein the insulation layer and the stop layer are etched using a dry etching method.

14. The method according to claim 1, wherein the insulation layer and the stop layer are etched using a dry etching method.

15. The method according to claim 1, wherein the metal layer is formed using a PVD (Physical Vapor Deposition) method.

16. The method according to claim 15, wherein the metal layer is made of Al—Cu alloy.

17. The method according to claim 16, wherein the metal layer has a thickness ranging from 1000 Å to 8000 Å before the planarization.

18. The method according to claim 17, wherein the metal layer and the insulation fence are planarized using a CMP (Chemical Mechanical Polishing) method.

19. The method according to claim 16, wherein the planarized metal layer has a thickness ranging from 500 Å to 7500 Å.

* * * * *